United States Patent [19]

Rogers

[11] 4,364,805
[45] Dec. 21, 1982

[54] GAS ELECTRODE OPERATION

[75] Inventor: Douglas K. Rogers, Painesville, Ohio

[73] Assignee: Diamond Shamrock Corporation, Dallas, Tex.

[21] Appl. No.: 261,773

[22] Filed: May 8, 1981

[51] Int. Cl.³ .................. C25B 1/34; C25B 11/03; C25B 11/08; C25B 11/12

[52] U.S. Cl. .................. 204/98; 204/128; 204/265; 204/291; 204/294; 429/13

[58] Field of Search ............ 204/98, 128, 265–266, 204/291–294; 429/13, 42

[56] References Cited

U.S. PATENT DOCUMENTS

| | | | |
|---|---|---|---|
| 3,607,687 | 9/1971 | Grangaard | 204/265 |
| 3,770,508 | 11/1973 | Sandler | 429/13 |
| 4,035,255 | 7/1977 | Gritzner | 204/128 |
| 4,121,992 | 10/1978 | Towsley | 204/265 |
| 4,221,644 | 8/1979 | LaBarre | 204/98 |

Primary Examiner—R. L. Andrews
Attorney, Agent, or Firm—John P. Hazzard; Woodrow W. Ban

[57] ABSTRACT

This disclosure is directed to operating gas electrodes, e.g., oxygen (air) cathodes at "blow-through" pressures of oxygen-containing gas, viz., oxygen or air pressures exceeding the pressure(s) at which bubble-through of such gas occurs, which pressures result in savings due to reduced cathode potential (voltage) during operation. Depending upon the specific oxygen (air) cathode employed, the pressures required to obtain blow-through can vary widely. Usually, however, oxygen (air) pressures of 2 to 15 psig are satisfactory to accomplish blow-through.

6 Claims, 1 Drawing Figure

GAS ELECTRODE OPERATION

BACKGROUND OF THE INVENTION

In the field of electrochemistry there is a well-known electrochemical cell known as a chlor-alkali cell. In this cell, an electric current is passed through a saturated brine (sodium chloride salt) solution to produce chlorine gas and caustic soda (sodium hydroxide). A large portion of the chlorine and caustic soda for the chemical and plastics industries are produced in chlor-alkali cells.

Such cells are divided by a separator into anode and cathode compartments. The separator characteristically can be a substantially hydraulically impermeable membrane, e.g., a hydraulically impermeable cation exchange membrane, such as the commercially available NAFION manufactured by the E. I. du Pont de Nemours & Company. Alternatively, the separator can be a porous diaphragm, e.g., asbestos, which can be in the form of vacuum deposited fibers or asbestos paper sheet as are well known in the art. The anode can be a valve metal, e.g., titanium, provided with a precious metal coating to yield what is known in the art as a dimensionally stable anode.

One of the unwanted byproducts present in a chlor-alkali cell is hydrogen which forms at the cell cathode. This hydrogen increases the power requirement for the overall electrochemical process, and eliminating its formation is one of the desired results in chlor-alkali cell operation.

It has been estimated that 25 percent of the electrical energy required to operate a chlor-alkali cell is utilized due to the formation of hydrogen at the cathode. Hence, the prevention of hydrogen formation, e.g., by oxygen reduction at the cathode, can lead to substantial savings in the cost of electricity required to operate the cell. In fairly recent attempts to achieve cost savings and energy savings in respect of operating chlor-alkali cells, attention has been directed to various forms of what are known as oxygen (air) cathodes. These cathodes prevent the formation of molecular hydrogen at the cathode and instead reduce oxygen to form hydroxyl ions. Savings in cost for electrical energy are thereby achieved.

Typical operation of an oxygen (air) cathode requires use of air pressure below bubble-through and an oxygen flow rate sufficient to provide no less than about 2.5 times the stoichiometric amount required for reaction. Customarily pressure is measured in inches of water corresponding to the air pressure delivered. Operation of an oxygen cathode in the normal mode involves use of conditions which avoid blow-through of the oxygen or air because it is generally observed that performance decreases at air pressures incipient to blow-through. Also, there are problems with handling air which has made its way into the catholyte chamber in cells designed for standard operation. These ideas have served as roadblocks to any thought that blow-through may be preferable in operation of gas depolarized electrodes. Pressures in excess of blow-through do result in better voltage. The term "blow-through" pressures as used herein means oxygen or air pressures exceeding the pressure(s) at which bubble-through of such gas occurs resulting in reduced operating cathode potential. Usually oxygen/air pressures of about 5 to about 15 psig are satisfactory to accomplish blow-through. The term "bubble-through" as used herein means that air supplied to the cathode penetrates the cathode and appears in the electrolyte as a heterogeneous phase of bubbles.

U.S. Pat. No. 4,221,644 to Ronald L. LaBarre is directed to a method for operating oxygen electrodes with the stated purpose of maximizing the power efficiency available while minimizing the voltage necessary to operate such oxygen electrodes. The LaBarre method includes control of the pressure of the air feed side of the oxygen electrode, control of the total flow of the air feed side, humidification of the air feed side of the oxygen electrode and eliminating $CO_2$ from the air feed to increase the lifetime of such electrodes as applied to a chlor-alkali electrolytic cell. At column 4, lines 9–14 of LaBarre, it is stated that the air is fed to the interior of the oxygen compartment at a positive gauge pressure so as to accomplish a total flow rate in excess of the theoretical stoichiometric amount of oxygen necessary for the reaction. At column 4, lines 47–50, LaBarre states that the $CO_2$-free air is humidified and provided at a positive gauge pressure and at a positive total flow of from 1.5 to 10 times the stoichiometric amount of oxygen. At column 10 of LaBarre, it is stated that the pressure in the oxygen compartment 24 is higher than that in the cathode compartment 22. The increased pressure, which may be zero gauge to bubble-through but due to the electrolyte head may be negative absolute, assists in mass transfer of the oxidizing gas such as air with $CO_2$ removed into the cathode 18 thereby preventing oxygen depletion in the reaction zone within the cathode 18 and leading to a longer cathode lifetime. It is stated that this pressure differential is based upon the partial pressure of the oxygen present. The preferred total flows are between 0 and 10 times the theoretical stoichiometric amount of oxygen necessary for the reaction with a flow of about 2.5 times being stated as the best.

The present "blow through" oxygen (air) pressure method of operating an oxygen (air) cathode differs from that of U.S. Pat. No. 4,221,644 in the following respects. Whereas in the LaBarre patent, feed air is introduced at one end of the cathode chamber and depleted air withdrawn from the opposite end containing all the nitrogen of the feed streams; the present method introduces the feed air in one and then removes all or some of the depleted air from the electrolyte side of the cathode. In the LaBarre patent, the nitrogen must diffuse back out of the interior of the cathode, and the oxygen must diffuse in through a stagnant layer of nitrogen. In the present method, the nitrogen and oxygen are physically flowed through the porous cathode face; and whereas diffusion must occur in the interior of the active cathode area, the diffusion path is shortened and voltage is improved.

DETAILED DESCRIPTION OF THE INVENTION

Figure 1:
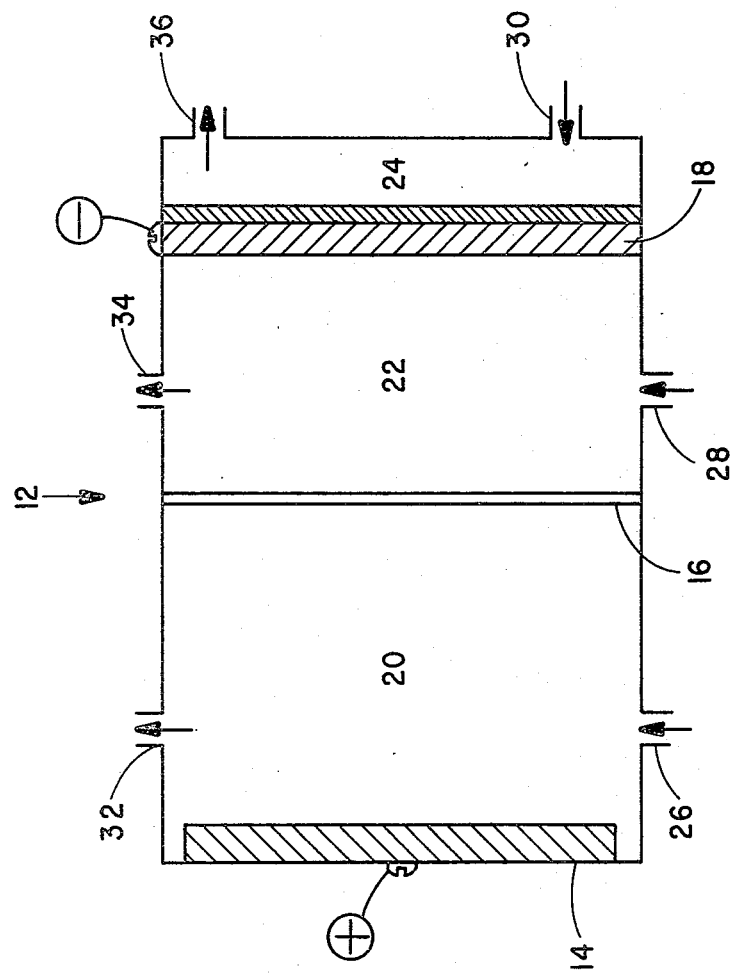

The present invention is applicable to any gas diffusion electrode and in addition to finding utility in oxygen (air) cathodes in chlor-alkali cells, this invention is useful in aluminum-air batteries and other gas-solid-liquid diffusion systems, such as fuel cells using gaseous hydrocarbon feed; iron-air, zinc-air, hydrogen-air and related and similar systems.

The present invention is based upon the discovery that by operation of an oxygen (air) cathode at blow-through oxygen (air) pressures, the cell can be operated at lower potential thereby saving in the cost required for electrical energy to operate the cell containing the oxygen (air) cathode. As noted previously, the exact pressures required will be dependent upon the particular oxygen cathode utilized and the type of operation being conducted within the electrolytic cell. For example, when utilizing three-layer laminated matrix oxygen cathodes of the type more fully described hereinbelow, typical blow-through pressures for oxygen (air) are within the range of from about 2 to about 15 psig (50 to 400 inches of water). Additionally the specific pressures required to obtain blow-through operation contemplated herein will vary depending upon the design of the particular oxygen (air) cathode.

BASIC CELL COMPONENTS

The invention will be understood in further detail in respect of the sole FIGURE of the drawing. As indicated in the drawing, electrolytic cell 12 is comprised of anode 14, cathode 18 and separator 16 dividing the cell into anode compartment 20 and cathode compartment 22. To the right of cathode compartment 22 is the oxygen (air) compartment 24 having the oxygen (air) inlet 30 and a corresponding outlet 36 for the oxygen depleted effluent gas. Anolyte, e.g., a sodium chloride (brine) aqueous solution, is introduced through anode inlet 26 and spent anolyte liquor is removed via outlet 32. Similarly, water and caustic are introduced into the cell via catholyte inlet 28 and spent catholyte liquor is removed through outlet 34. Of course, there is provided a foundation for the cell (not shown) adequate to permit a plurality of such electrolytic cells 12 to be arranged in correct alignment in the form of a bank of electrolytic cells for production purposes.

The cell 12 itself can be manufactured from various materials, either metallic or plastic in nature, as long as these materials resist the corrosive surroundings of the material which with they are in contact and the temperature characteristics present during the operation of the cell. Hence, the anode compartment of a chlor-alkali cell must be resistant to chlorine, and the cathode compartment must be resistant to the caustic, viz., sodium hydroxide, which will be present within this compartment. Such materials generally include, but are not necessarily limited to, metallic materials such as steel, nickel, titanium and other valve metals in addition to plastics such as polyvinyl chloride, polyethylene, polypropylene, fiberglass, resin-impregnated fiberglass and other materials too numerous to mention. The valve metals include aluminum, molybdenum, niobium, titanium, tungsten, zirconium and alloys thereof.

The separator 16 can be of the diaphragm or membrane variety. The separator materials set forth in U.S. Pat. No. 4,221,644 can be employed in accordance with the process of this invention. Thus the separator 16 as shown in the drawing can be of the substantially hydraulically impermeable cation exchange membrane variety. According to a preferred embodiment of this invention, the separator 16 is a polymeric material marketed by the E. I. duPont de Nemours and Company under the trademark NAFION.

THE ELECTRODES, THEMSELVES

The present invention and its benefits are applicable to a wide variety of oxygen cathodes, esp., those containing an active layer, a wetproofing (backing) layer and a current distributor. Preferably, such oxygen (air) cathodes 18 contain these 3 components in a laminated and/or laminated-sintered electrode.

According to one preferred embodiment of this invention, oxygen cathode 18 is of the type described and claimed in U.S. patent application Ser. No. 202,585 entitled "Three-layer Laminated Matrix Electrode" filed on Oct. 31, 1980, in the name of Frank Solomon. The disclosure of this application is incorporated herein by reference. Such three-layer laminated matrix electrodes are laminates of a polytetrafluoroethylene (PTFE)-containing wetproofing layer laminated on one side to a matrix active layer comprising active carbon particles (catalyzed or uncatalyzed) present within an unsintered network (matrix) of fibrillated carbon black-polytetrafluoroethylene. The opposite surface of the active layer is laminated to a current distributor of the type more fully described hereinbelow.

WETPROOFING LAYER

The PTFE-containing wetproofing layer can be prepared by a single pass process, viz., passing it once through heated rollers, and in the final laminate is comprised primarily of PTFE with pores evenly distributed therethrough. Such PTFE-containing wetproofing layers can be prepared as follows:

Two hundred cubic centimeters of isopropyl alcohol were poured into an "Osterizer" blender. Then 49 grams of "duPont 6A" polytetrafluoroethylene were placed in the blender and the PTFE (alcohol dispersion) was blended at the "blend" position for approximately one minute. The resulting slurry had a thick pasty consistency. Then another 100 cc of isopropyl alcohol were added in the blender and the mixture was blended (again at the "blend" position) for an additional two minutes.

Then 91 grams of particulate sodium carbonate in isopropanol (ball milled and having an average particle size of approximately 3.5 microns, as determined by a Fisher Sub Sieve Sizer) were added to the blender. This PTFE-sodium carbonate mixture was then blended at the "blend" position in the "Osterizer" blender for 3 minutes followed by a higher speed blending at the "liquefying" position for an additional one minute. The resulting PTFE-sodium carbonate slurry was then poured from the blender onto a Buchner funnel and filtered and then placed in an oven at 80° C. where it was dried for 3 hours resulting in 136.2 grams yield of PTFE-sodium carbonate mixture. This mixture contained approximately 35 weight parts of PTFE and 65 weight parts of sodium carbonate.

This mixture was mildly fibrillated in a Brabender Prep Center with attached sigma mixer as described above.

After fibrillating, which compresses and greatly attenuates the PTFE, the fibrillated material is chopped to a fine dry powder using a coffee blender, i.e., Type Varco, Inc. Model 228.1.00 made in France. Chopping to the desired extent takes from about 5 to 10 seconds because the mix is friable. The extent of chopping can be varied as long as the material is finely chopped.

The chopped PTFE-$Na_2CO_3$ mix is fed to six inch diameter chrome-plated steel rolls heated to about 80° C. Typically, these rolls are set at a gap of 0.008 inch (8 mils) for this operation. The sheets are formed directly in one pass and are ready for use as backing layers in forming electrodes, e.g., oxygen cathodes, with no further processing beyond cutting, trimming to size and the like.

ACTIVE LAYER

The matrix active layer to which the above wetproofing layer can be secured during lamination is one comprised of catalyzed or uncatalyzed active carbon particles present within an unsintered network (matrix) of fibrillated carbon black-polytetrafluoroethylene. This matrix active layer can contain silver as a catalyst or a catalyst enhancer, the active carbon particles, per se, having catalytic activity for the reaction taking place within the oxygen (air) cathode 18. Such silver-catalyzed matrix active layers can be prepared as follows:

Commercially available ball milled "RB carbon" was found to have an ash content of approximately 12 percent as received. This "RB carbon" was treated in 38 percent KOH for 16 hours at 115° C. and found to contain 5.6 percent ash content after a subsequent furnace operation. The alkali treated "RB carbon" was then treated (immersed) for 16 hours at room temperature in 1:1 aqueous hydrochloric acid (20 percent concentration). The resulting ash content had been reduced to 2.8 percent. "RB carbon", deashed as above, was silvered in accordance with the following procedure:

Twenty (20 g) grams of deashed "RB carbon" were soaked in 500 ml of 0.161 N (normal) aqueous $AgNO_3$ with stirring for two hours; the excess solution was filtered off to obtain a filter cake. A retrieved filtrate was 460 ml of 0.124 N $AgNO_3$. The filter cake was rapidly stirred into an 85° C. alkaline formaldehyde solution, prepared using 300 cc (cubic centimeters) water, and 30 cc of 30 percent aqueous NaOH and 22 cc of 37 percent aqueous $CH_2O$, to ppt. Ag in the pores of the active carbon.

Calculation indicated that 79 percent of the 2.58 grams of retained silver in the catalyst was derived from adsorbed silver nitrate.

Separately, "Shawinigan Black", a commercially available acetylene carbon black, was teflonated with "Teflon 30" (duPont polytetrafluoroethylene dispersion), using an ultrasonic generator to obtain intimate mixture. 7.2 grams of the dried carbon black/PTFE mix was high speed chopped, spread in a dish, and then heat treated at 525° F. for 20 minutes. Upon removal and cooling, it was once again high speed chopped, this time for 10 seconds. Then 18 grams of the classified silvered active carbon was added to the 7.2 grams of carbon black-Teflon mix, high speed chopped for 15 seconds, and placed into a fiberizing (fibrillating) apparatus. The apparatus used for fiberizing consists of a Brabender Prep Center, Model D101, with an attached measuring head REO-6 on the Brabender Prep Center and medium shear blades were used. The mixture was added to the cavity of the mixer using 50 cc of a 30/70 (by volume) mixture of isopropyl alcohol in water as a lubricant to aid in fibrillating. The mixer was then run for 5 minutes at 30 rpm at 50° C., after which the material was removed as a fibrous coherent mass. This mass was then oven dried in a vacuum oven and was high speed chopped in preparation for rolling.

The chopped particulate material was then passed through a rolling mill, a Bolling rubber mill. The resulting matrix active layer sheet had an area density of 22.6 milligrams per square centimeter and was ready for lamination.

A matrix active layer containing platinum catalyzed active carbon particles can be prepared in accordance with the procedure described above for deposition of silver catalyst except that platinum was deposited on the deashed active ("RB") carbon instead of silver. The 10 to 20 micron classified deashed "RB" carbon had platinum applied thereto in accordance with the procedure described in U.S. Pat. No. 4,044,193 using $H_3Pt(SO_3)_2OH$ to deposit one weight part platinum per 34 weight parts of deashed active carbon. After fibrillation and upon rolling, the area density of the active layer was determined to be 22.2 $m/cm^2$. This platinum-catalyzed matrix active layer was then ready for lamination.

CURRENT DISTRIBUTOR

As noted above, the aforementioned laminated oxygen cathodes contain a current distributor. The current distributor can be any electro-conductive, woven or nonwoven, symmetrical or asymmetric, wire mesh or grid. When the current distributor is asymmetric, it is preferably one which has an asymmetric woven wire mesh wherein a greater number of wires is oriented in a direction perpendicular to the major current distributor, viz., the current feeder bars and spanning the narrow part of the rectangular electrode. A smaller number of wire strands is arranged in the other, viz., horizontal, direction. In other words, in a preferred embodiment involving the use of an asymmetric woven wire mesh current distributor, the major current distributor supplies current to the periphery of the electrode. The majority of the current is supplied across the short dimension (vertical) in cases involving rectangular electrodes. Hence such asymmetric woven wire mesh current distributors have more fill wires than warp wires. Although any electroconductive material can be employed in the current distributor, preferably the wires of the mesh material are selected from the group consisting of nickel, nickel-plated copper, silver-plated nickel and silver-plated, nickel-plated copper, viz., copper wires that are first plated with nickel and then over plated with silver upon the nickel.

Such asymmetric woven wire mesh current distributors characteristically contain about twice as many wires in the vertical direction as are contained in the horizontal direction. Such a configuration reflects savings of approximately 50 percent in weaving time and 25 percent in material costs. The asymmetric woven wire mesh current distributors referred to hereinabove are described and claimed in U.S. patent application Ser. No. 202,574 (Docket 3203) filed in the name of Frank Solomon on Oct. 31, 1980, and entitled "Asymmetric Current Distributor". The disclosure of this application is incorporated herein by reference.

Alternatively the current distributor layer can be of the plaque type, viz., a comparatively compact yet porous layer, characteristically having porosities ranging from about 40 to 60 percent and made of copper, nickel, silver, titanium, iron, etc.

Plaque current distributor layers are usually from 10 to 30 mils in thickness and are well known in the art of electrochemistry.

Instead of a plaque-type current distributor, the electrodes of this invention can contain a symmetrical woven wire mesh distributor or one of the nonwoven or wire grid type, either symmetrical or asymmetric.

OXYGEN CATHODE VARIATIONS

The three-layer laminated matrix electrodes, the use of which is contemplated according to the process herein, can be laminated with heat and pressure. These laminates usually have the active layer centrally located, viz., positioned in the middle between the PTFE-containing wetproofing layer on the one side and the current distributor layer on the other side. The three layers arranged as described are laminated at temperatures ranging from about 100° to 130° C. and pressures of 0.5 to 10 T/in² followed by removal from the pressing device, usually a hydraulic press. The laminates are preferably then subjected to a hot soaking step(s) in ethylene glycol or equivalent polyol to enhance the removal of the pore-forming agent(s) employed to form the aforementioned backing (wetproofing) layer and any bulking and/or pore-forming agent optionally included in the active layer, upon subsequent washing(s) with water.

In accordance with one preferred embodiment of this invention, a three-layer laminated matrix electrode is formed utilizing the PTFE-containing wetproofing layer prepared as described above laminated to a current distributor and respective matrix active layers which were platinum-catalyzed and silver-catalyzed in a manner set forth above. The current distributor employed was a 0.005 inch diameter nickel woven wire mesh having a 0.0003 inch thick silver plating and a 50×50 woven strand arrangement. The lamination was performed in a hydraulic press at 100° to 130° C. using pressures of 4 to 8.5 T/in² for several minutes. These laminates were then hot soaked in ethylene glycol at 75° C. for 20 minutes before water washing at 65° C. for 18 hours followed by drying. The laminates were then prepared for use as an oxygen (air) cathode in accordance with the blow-through oxygen (air) pressure operation in accordance with this invention.

According to another preferred embodiment of this invention, three-layer laminated oxygen (air) cathodes are prepared utilizing the PTFE-containing wetproofing layer prepared as described above in conjunction with a current distributor of the type as described above and an active layer or sheet containing from about 60 to about 85 weight percent active carbon particles, the remainder being unsintered, fibrillated polytetrafluoroethylene in intimate admixture with said active carbon. Such active layer can be prepared as follows: 100 grams of RB active carbon were ball milled for 4 hours in water. This carbon was subsequently treated with 1600 ml or 38 percent NaOH for an hour at 110° to 120° C. with stirring. It was then filtered and washed. This treatment was repeated three times, then followed by a room temperature overnight soak in 1:1 HCl and a final washing and drying in air at 110° C. 20 g of carbon, so prepared, were then platinized in a ratio of 28 parts of carbon to one part Pt, using $H_3Pt(SO_3)_2OH$ in accordance with the procedure of U.S. Pat. No. 4,044,193. Twenty (20) grams of carbon were suspended in 333 ml of water and 357 ml of $H_3Pt(SO_3)_2OH$ (200 g Pt/liter solution) were added and then decomposed to hydrous platinum oxide by the addition of 8.6 ml of 35 percent $H_2O_2$. After filtering, washing and air drying at 140° C., the catalyzed carbon was ready for the next step, "Teflonation". 20 g of catalyzed carbon were suspended in 300 ml water with stirring. 8.4 ml of "Teflon 30" dispersion were separately diluted in 300 ml of water. The diluted Teflon 30 dispersion was slowly added to the catalyzed carbon suspension. After coagulation, the mixture was washed and dried. The mix was weighed and was found to be 25 g. The 25 g mix was then fibrillated by shear blending in the Brabender Prep Center, in measuring head type REO-6 using medium shear cams or blades. The mix was lubricated with 38 cc of 30 percent isopropanol in water and was kneaded for 2½ minutes at 25 rpm. It was then vacuum dried. 3 g of mix were chopped 30 seconds in a Varco Mod. 228-1 coffee grinder and then rolled at 75° C. through 6 inch diameter rolls at a roll separation of 0.007 inch. The rolled sheet was 0.010 inch thick. At this point, the sheet was ready for incorporation into an electrode.

Alternatively the active layer can be prepared utilizing silver-catalyzed active carbon. The procedure described above for preparation of the platinum-catalyzed active layer is followed up to the point of applying the catalyst. To catalyze the carbon with silver, 16.7 grams of carbon were suspended in 396 milliliters of water containing 21.3 grams of silver nitrate and stirred for two hours. The carbon was then filtered to remove all excess liquid and the filter cake was then slurried in a previously prepared solution of 250 milliliters of water, 25 milliliters of a 30 percent sodium hydroxide and 18.3 milliliters of a 37 percent formaldehyde solution and was held at 85° C. for 60 minutes with continuous stirring. The resulting silvered carbon was then washed and dried, and processed to sheet material following the procedure indicated above utilizing the same sequence with only minor variations. The carbon to silver ratio was 5:1.

The active layers prepared as described above to contain either the platinum or silver catalyst can then be laminated with the active layer positioned in the middle between the PTFE backing layer on the one side and the current distributor layer on the other side. These three layers arranged as described were laminated using heat and pressure at temperatures ranging from about 100° to about 130° C. and pressures of 0.5 to 10 T/in² followed by removal from the press. These laminates were then subjected to a hot soaking step in ethylene glycol followed by a subsequent washing(s) with water.

Specifically the platinum-catalyzed and silver-catalyzed active layers prepared as described above to contain from about 60 to about 85 weight percent active carbon particles, the remainder being unsintered, fibrillated polytetrafluoroethylene in intimate admixture therewith were prepared by laminating a current distributor, silver plated 50×50×0.005 nickel wire cloth and a hydrophobic gas diffusion wetproofing layer containing 65 weight percent sodium carbonate and 35 weight percent PTFE to each of the aforesaid active layer sheets with the current distributor being in contact with one surface of the active layer and the opposite surface in contact with the PTFE wetproofing layer prepared as described above. The lamination was done in a hydraulic press at 8.5 T/in² pressure and 115° C. and was followed by hot soaking in ethylene glycol as described above followed by water washing (to remove pore former) and drying. These laminates were then ready for utilization as oxygen (air) cathodes 18 for operation by the blow-through procedure in accordance with this invention.

According to yet another embodiment of this invention, the oxygen (air) cathode 18 is a non-bleeding gas electrode of the type described and claimed in U.S. patent application Ser. No. 202,564 entitled "Non-bleeding Electrode" and filed in the name of Frank Solomon on Oct. 31, 1980. Such electrodes are comprised of a hydrophobic, polytetrafluoroethylene-containing porous backing layer, an active layer containing high surface area carbon particles wherein said active layer has pores sufficiently large to relieve internal liquid pressures therein and a current distributor. Such an oxygen (air) electrode can be made by lamination in the manners described above or lamination followed by sintering. Typically such laminated, sintered electrodes are prepared as follows: Steam treated "XC-72R" high surface area carbon black was platinized in accordance with the procedure of U.S. Pat. No. 4,004,193 using $H_3Pt(SO_3)_2OH$ to deposit approximately 5 percent platinum on the carbon black. This platinum catalyzed carbon black was then teflonated in a manner described above using an ultrasonic generator. The teflonated platinized carbon black was then mixed with the equivalent of what amounts to 25 weight percent of the total active layer of ball milled sodium carbonate having an average particle size of about 5 microns. The wet mix was dried, extracted overnight with chloroform and then the active layers were formed by deposition on a layer of sodium chloride on filter paper. Each active layer contained approximately 285 milligrams of said active layer mix. The active layers were then placed in the middle between a silver-plated nickel current distributor (described in more detail hereinabove) having a 50×50 woven wire mesh and the PTFE-containing backing layer for form a sandwich assembly. Both assemblies were respectively consolidated by laminating at 112° C. at a pressure of 5 $T/in^2$ in a hydraulic press. On removal, the assemblies were soaked in hot ethylene glycol (75° C.) for 20 minutes and then washed in hot water (to remove the pore former) and dried. One laminated electrode was then sintered in argon under a flat weight at 675° F. (357° C.) for 40 minutes. The other was not sintered after lamination. Both such oxygen cathodes can be subjected to the blow-through process of this invention to result in lower operating voltage.

The present invention will be illustrated further in the examples which follow. In these examples, all parts, percents and ratios are by weight unless otherwise indicated.

EXAMPLE 1

A one square inch test cathode was cut from a larger mass laminated sheet prepared as follows:

A porous, self-sustaining, coherent, unsintered, polyaxially oriented wetproofing layer of fibrillated PTFE was formed to contain 65 percent of ball milled $Na_2CO_3$ pore former and 35 percent PTFE (as an aqueous dispersion of PTFE coagulum, viz., duPont PTFE 42, coagulated into a floc by addition of isopropyl alcohol) by Sigma mixing same, chopping and rolling into sheet form by passing it several times through rollers, with folding and change of direction on each pass to result in a polyaxially oriented sheet. This sheet was then degreased, viz., the oil was extracted with "M-Clere D" (a commercial solvent) and heated at 300° C. for 20 minutes to prepare it for assembly.

An active layer of "Teflonated", fiberized (fibrillated), platinized, RBDA active carbon (RB carbon previously deashed by alkali then acid treatment as described above) was prepared to contain 73.5 percent RBDA carbon, 2.0 percent platinum (applied by the method of U.S. Pat. No. 4,044,193) and 24.5 percent PTFE. After platinizing, the RBDA particles were "Teflonated", fiberized, rolled into sheet form and then assembled as the central layer with the PTFE wetproofing layer on one side and a current distributor on the other side. The current distributor was a 30×30 mesh of 0.006 inch diameter nickel wire having a 0.0003 inch thick silver plating. The assembly was pressed at 8.5 $T/in^2$ and 115° C. for 3 minutes to yield a laminated cathode.

This cathode was started at 2.0 amps per square inch, in about 30 percent NaOH at 60° C. and at an air rate of 90 cc/min for a one square inch electrode. Operation was standard air feed at about ½ psig with no air bubbling through to the wetted face of the cathode. This operation continued for 2 more days with air pressure being raised to 1½ psig. No bubble-through occurred at this time. After 3 days of operation under the above conditions, an accident resulted in the air supply pressure increasing dramatically and caused high pressure, high air flow blow-through conditions at the cathode being tested. While this blow-through occurred, it was noted that the cathode's potential registered −375 mV vs. Hg/HgO reference. This voltage was 400 mV better than the prior −774 mV potential of the previous 3 days.

Upon restoration of normal air pressures at the manifold feeding the cell bank, the pressure at the cell was controlled to 2 psig and 90 cc/min flow where the bubble-through pressure was exceeded and air was visibly flowing through the porous cathode and bubbling into the electrolyte. In this condition, the cathode potential was −611 mV at first and then increased to −650 mV where it remained for several days until the test was terminated. This performance was about 125 mV savings over initial "standard" operation in the lower pressure non-blow-through mode of operation.

EXAMPLE 2

Another cathode of the same type and prepared as described in Example 1 but containing 71.0 percent RBDA, 4.0 percent platinum and 25.0 percent PTFE (as "Teflon 30") was tested and performed for 17 days at around −530 mV vs. Hg/HgO under non-blow-through conditions at 90 cc/min air rate for a one square inch electrode, at 7 inches water gauge pressure on the air side, using approximately 30 percent NaOH at 80° C. and at a current density of 2.0 amps per square inch. When air pressure was increased at the same mass flow rate, blow-through operation occurred and cathode potential decreased to −516 mV at 3 psig, −450 mV at 4 psig, −260 mV at 8 psig, and −228 mV at 9.5 psig. Pressure was increased by closing down an air outlet valve and forcing more and more of the fixed air stream through the cathode. At the 9.5 psig pressure, almost all the air was going through the face of the cathode and voltage savings over the previous low pressure, non-blow-through operation was about 300 mV.

EXAMPLE 3

A laminated oxygen cathode was prepared as in Example 1. This cathode was operated for one hour at 9 psig air pressure and 90 cc/min flow rate for a one square inch cathode. Air was visibly blowing-through. The cell was operating at a current density of 2.0 amps per square inch at 80° C., using 30 percent NaOH electrolyte. Cathode potential at the one hour mark was −267 mV vs. Hg/HgO reference.

In order to determine what the potential would be in "standard" non-blow-through air feed, the pressure was dropped to 0 psig where a potential of −358 mV was recorded. This is 91 mV poorer performance given the same conditions except that high air pressure blow-through feed was not employed. In fact, since less of the air was blowing-through the cathode at lower pressures from the 9 psig originally set, and more of the set air flow rated at 90 cc/min was going across the face of the cathode instead, potentials became poorer as pressure was dropped as can be seen from the table below.

TABLE

| Air Feed Pressure (psig) | Cathode Potential vs. Hg/HgO Reference (mV) | NOTE |
| --- | --- | --- |
| 9 | −267 | Most air through cathode face |
| 8 | −270 | |
| 7 | −285 | |
| 6 | −294 | |
| 5 | −315 | |
| 4 | −340 | Blow-through operation |
| 0 | −358 | All air across the cathode face non-blow-through |

EXAMPLE 4

A one square inch test cathode was cut from a larger laminated sheet prepared as follows:

A porous, self-sustaining, coherent, unsintered, uniaxially oriented wetproofing layer containing 65 percent $Na_2CO_3$ and 35 percent PTFE was made in accordance with the one pass procedure set forth above using "duPont 6A" PTFE dispersion.

A matrix active layer was prepared containing 28.6 percent of "Teflonated" Shawinigan Black (acetylene black) carbon and 71.4 percent of silver catalyzed RBDA active carbon. The "Teflonated" Shawinigan Black contained 70 percent Shawinigan Black and 30 percent "Teflon 30". The silver catalyzed RBDA contained 82 percent RBDA active carbon particles (classified to +50/−10 micron size) and 18 percent silver deposited from $AgNO_3$ as set forth above.

The current distributor was 60×58, 0.004 inch diameter nickel wire cloth with a 0.0003 inch thick silver plating. These layers were assembled and laminated using heat and pressure as in Example 1.

Operation of this cathode was begun at a potential of −315 mV vs. Hg/HgO reference when operating at 2.0 amps per square inch at 4 times the stoichiometric air requirement in the blow-through mode. Caustic concentration was about 30 percent and temperature was 85° C.

On the thirteenth day of operation, the cathode potential was −307 mV in the blow-through mode. Pressure was not measured in this apparatus, but 100 percent of the feed air was blowing through the cathode as there was no other air outlet in the air chamber. Pressure was dropped to atmospheric by opening the air chamber outlet to the atmosphere to check performance under "standard" non-blow-through operation and the potential was −322 mV or 15 mV worse performance. The cathode was then returned to 100 percent air blow-through the cathode face and performance was steady for 172 days of operation where cathode potential averaged −307 mV vs. Hg/HgO reference.

I claim:

1. In a method of operating a gas electrode employing an oxygen-containing gas; and a laminate oxygen cathode of a wetproofing layer containing polytetrafluoroethylene particles, an active layer containing carbon particles, and a current distributor: the improvement which comprises feeding the oxygen-containing gas to the oxygen cathode at blow-through pressure.

2. A method as in claim 1 wherein said oxygen-containing gas is oxygen.

3. A method as in claim 1 wherein said oxygen-containing gas is $CO_2$-free air.

4. A method as in claim 1 wherein said carbon particles contain platinum catalyst.

5. A method as in claim 1 wherein said carbon particles contain silver catalyst.

6. A method as in claim 1 wherein said oxygen-containing gas is supplied at pressures ranging from about 2 to about 15 psig.

* * * * *